US011987474B1

(12) United States Patent
Passalacqua et al.

(10) Patent No.: US 11,987,474 B1
(45) Date of Patent: May 21, 2024

(54) RESCUE HOOK

(71) Applicant: Buckingham Manufacturing Company, Inc., Binghamton, NY (US)

(72) Inventors: Joseph J. Passalacqua, Boise, ID (US); Jonathan R. Andrews, Harpursville, NY (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 80 days.

(21) Appl. No.: 17/380,609

(22) Filed: Jul. 20, 2021

Related U.S. Application Data

(60) Provisional application No. 63/053,801, filed on Jul. 20, 2020.

(51) Int. Cl.
*B66C 1/36* (2006.01)

(52) U.S. Cl.
CPC .................................... *B66C 1/36* (2013.01)

(58) Field of Classification Search
CPC ........ B66C 1/36; F16B 45/023; F16B 45/024; F16B 45/026; B63B 21/54
USPC ............................................ 294/82.19, 191
See application file for complete search history.

(56) References Cited

U.S. PATENT DOCUMENTS

| | | | | | |
|---|---|---|---|---|---|
| 1,435,587 | A * | 11/1922 | Crandall | F16B 45/02 | 294/82.19 |
| D273,273 | S * | 4/1984 | Faidide | D8/367 | |
| 4,518,184 | A * | 5/1985 | Pecorini | B63B 21/54 | 114/221 R |
| D281,483 | S * | 11/1985 | Faidide | D8/382 | |
| 6,450,558 | B1 * | 9/2002 | Ringrose | B63B 21/54 | 24/600.1 |
| 8,469,421 | B2 * | 6/2013 | Buie | B66C 1/36 | 24/600.1 |
| 9,994,430 | B1 * | 6/2018 | Hooper | B62B 3/04 | |
| 10,436,241 | B2 * | 10/2019 | Hooper | F16B 45/021 | |

FOREIGN PATENT DOCUMENTS

| | | | | |
|---|---|---|---|---|
| GB | 1047076 | * | 11/1966 | |
| GB | 2106584 A | * | 4/1983 | B66C 1/36 |

* cited by examiner

*Primary Examiner* — Dean J Kramer
(74) *Attorney, Agent, or Firm* — Bond, Schoeneck & King, PLLC; Frederick J. M. Price

(57) ABSTRACT

The rescue hook can be remotely attached to a load and can self-center to position the load in an optimal place on the hook. One embodiment of the rescue hook has an opening for a placement tool such as an extended stick so a user can place the rescue hook onto an attachment point of a harness or object remotely. The body of the rescue hook can form an elongated throat to hold the attachment point and a gate pivotably attached to the body to enclose the throat.

26 Claims, 7 Drawing Sheets

RESCUE HOOK

REFERENCE TO RELATED APPLICATIONS

This application claims priority to U.S. Provisional Patent Application Ser. No. 63/053,801, filed on Jul. 20, 2020 and entitled "Rescue Hook" the entirety of which is incorporated herein.

BACKGROUND

The present disclosure relates generally to a rescue hook, more particularly, to a self-centering rescue hook.

In a rescue situation where the rescuer must attach a line to a victim from above, a combination of an extended pole and clip is commonly used. This combination can also be used to attach a line to a load from above or to attach a line to a person or load from a distance.

This situation arises most frequently in subterrain environments. Conventional clips such as snap hooks or carabiners are difficult to attach to the person or load as conventional hooks with gates require an additional tool to open the gate and do not have a way to be easily slid on to the load. In some situations, a hook with no gate is used as it is easier to attach to the item however this has an increased risk of the item falling and does not allow for the line to be attached without the extended pole. Conventional hooks also do not self-center so they can rotate into an unwanted orientation causing the hook to load improperly.

Therefore, there is a need for a rescue hook which can be attached easily to a person or load from a distance and self-center.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY

To solve the above-mentioned problems the rescue hook has an attachment point for a placement tool such as an extended stick and is configured to easily attach a line or rope to a person or load from a remote position. The rescue hook can be attached to a rated connection point on a person or a load. When the placement tool is removed the rescue hook can self-center. Then a user can lift the person or load up using the line, when this happens the rescue hook rotates so the person's rated attachment point is captured in the bottom of the rescue hook's throat which prevents release. In one example, the rescue hook meets industry standards such as the ANSI Z359.12 standard.

BRIEF DESCRIPTION OF THE DRAWINGS

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments.

Reference is now made briefly to the accompanying drawings, in which.

DETAILED DESCRIPTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
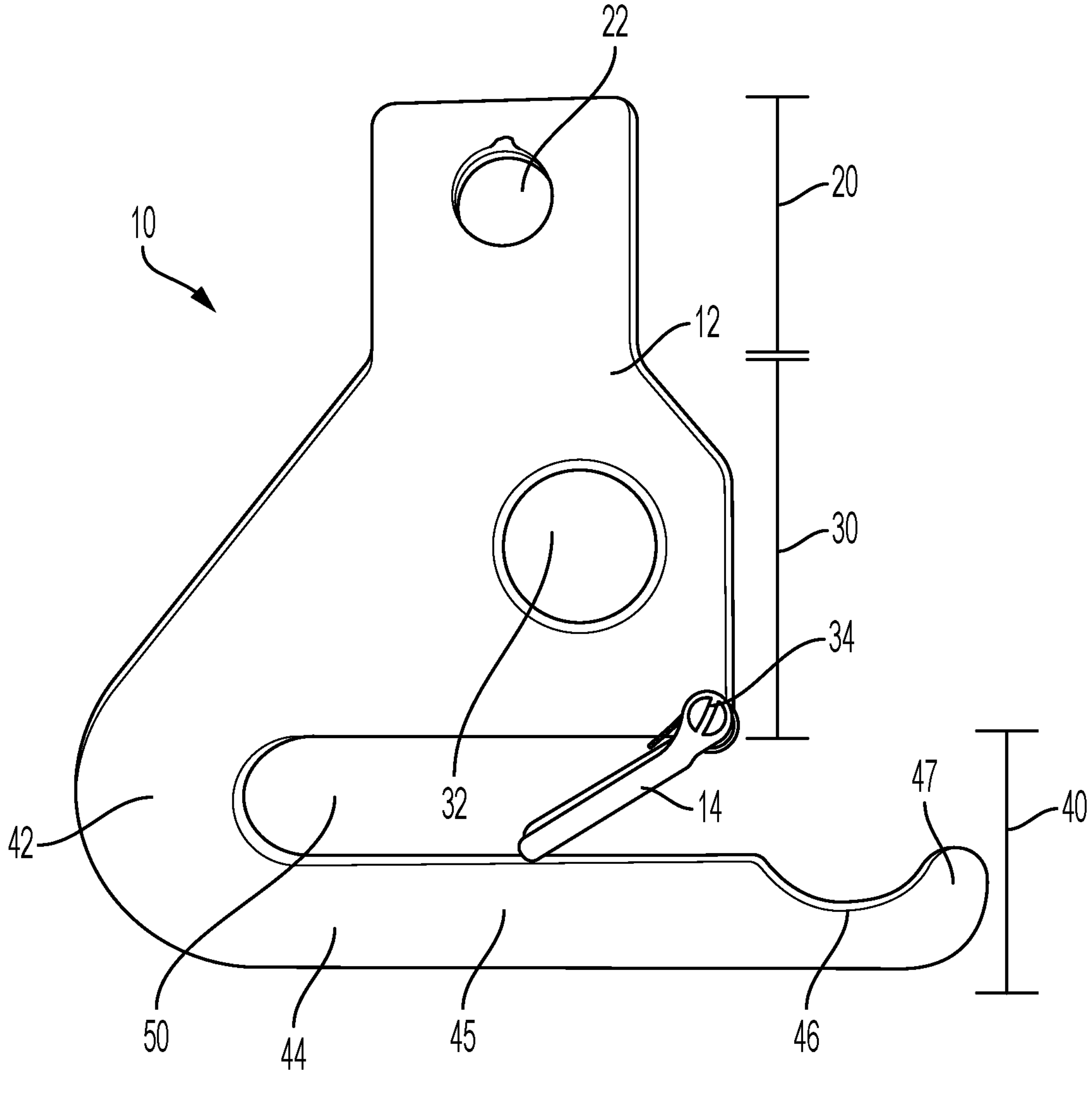
FIG. 1 is a front view of a rescue hook, according to an embodiment.
Figure 2:
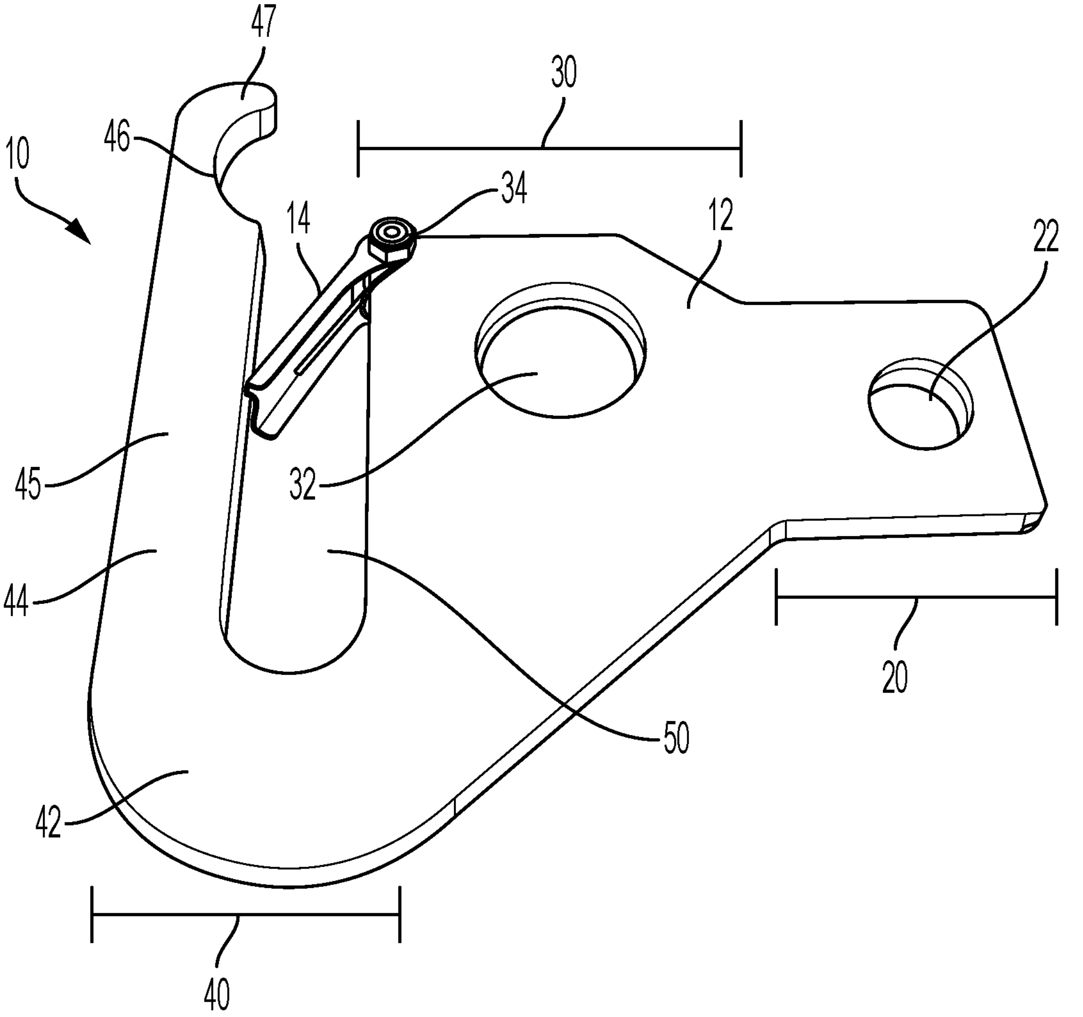
FIG. 2 is a perspective view of a rescue hook, according to an embodiment.
Figure 3:
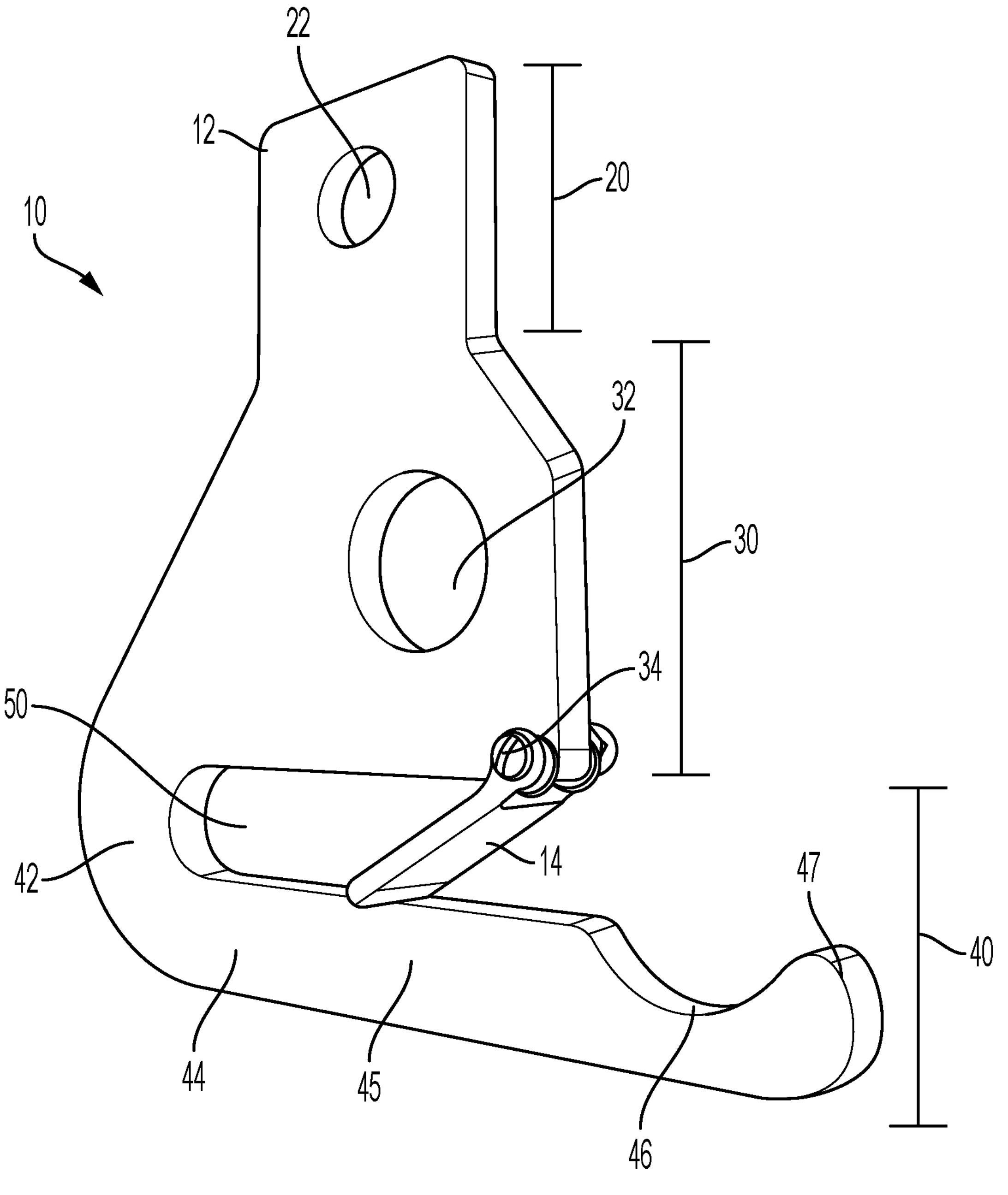
FIG. 3 is a perspective view of a rescue hook, according to an embodiment.

As shown in FIGS. 1-3 the rescue hook, referred to generally by reference numeral 10, in one example, generally comprises a body 12 and a gate 14. The body 12 can comprise an upper portion 20, a middle portion 30, and a lower portion 40. According to one embodiment, the upper portion 20 can comprise an upper opening 22, the middle portion 30 can comprise a middle opening 32 and a gate attachment point 34, and the lower portion 40 can comprise a bend 42 and an arm 44, the arm 44 having an extended portion 45, dip 46, and barb 47. The lower and middle portions 30, 40 of the body 12 can form a throat 50 which the gate 14 can close.

The rescue hook 10 can be attached to a placement tool that a user can use to move and position the rescue hook 10 onto an attachment point. Examples of placement tools include an extended stick, a hot stick, or a shotgun stick. A placement tool can have a universal adapter or be designed for use with an embodiment of the rescue hook 10. According to one embodiment, the placement tool can be connected to an attachment point on the upper portion 20. The attachment point can be the upper opening 22, or any other suitable means to be received or attached to the placement tool such as but not limited to a hook, magnet, or clip. According to an embodiment, the upper opening 22 is formed through the front and back surfaces of the upper portion 20. In the examples depicted the upper opening 22 is circular, however the upper opening 22 can be any other shape such as but not limited to oval, hexagonal, or elongated. In one embodiment, the upper opening 22 is positioned centrally along the horizontal axis of the rescue hook 10. In another embodiment, the upper opening 22 may be off set.

Figure 4:
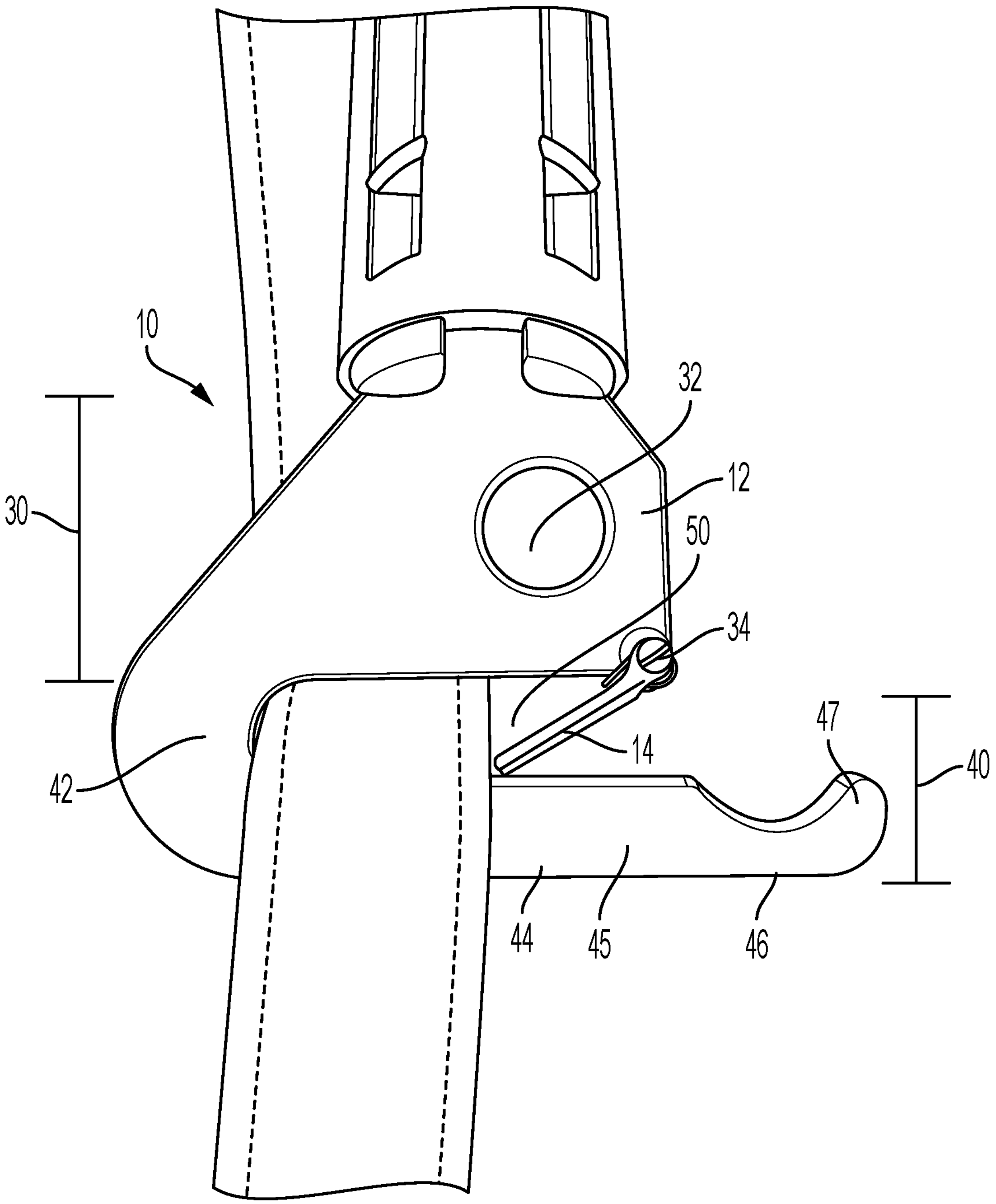
FIG. 4 is a perspective view of a rescue hook in use, according to an embodiment.

The upper portion 20 can be dimensioned to receive or attach to a placement tool. For example, the specific shape of the upper portion 22 can be configured to be received by a placement tool. In FIGS. 1-3 the outer edges of the upper opening 22 are generally rectangular in shape with straight edges. Referring now to FIG. 4, according to one embodiment, the upper opening 22 is dimensioned to be large enough for the hook of the shotgun stick and the dimensions of the upper portion 20 are small enough to be accepted by the receiving end of a shotgun stick.

The middle portion 30 of the body 12 is positioned below the upper portion 20 and can form the middle opening 32. The middle portion 30 according to one embodiment has a larger surface area than the upper portion 20. The body 12 is configured to facilitate the hook's 10 rotation into a position that captures the attachment point (hardware or webbing) and eliminate the risk of the attachment point releasing from the hook 10 prematurely. The middle opening 32 can be dimensioned to receive a connector such as a carabiner or clip and/or a rescue line or rope to the rescue hook 10. The middle opening 32 can be rounded such that a connector can glide around the edges easily. In the examples shown in the figures the middle opening 32 is circular, however the middle opening 32 can be any other shape such as but not limited to oval, hexagonal, or square. According to one embodiment the middle opening 32 is positioned centrally along a vertical axis of the rescue hook 10. This will facilitate the rescue hook 10 self-centering when there is a line or hook attached to the middle opening 32.

In one example, the body 12 of the rescue hook 10 forms an acute angle between the middle portion 30 and lower portion 40. The space formed between arm 44, bend 42, and middle portion 30 of the body 12 is throat 50. Throat 50 has an open end and a closed end the closed end being enclosed with bend 42. The open end of throat 50 can be enclosed with gate 14. In one example the bend 42 is rounded to form an acute angle, in another example the bend 42 can have straight edges. The bend 42 can be off centered from the middle opening 32. In use, the hook 10 will self-center such that the attached load is positioned in the bend 42, away from the open end of throat 50 and gate 14.

The dip 46 and barb 47 can be configured to guide the harness or strap of the attachment point into the throat 50. In one example, dip 46 and barb 47 extend past the middle portion 30 of the body 12. In the example shown in FIGS. 1-4 the barb 47 is rounded with the dip 46 adjacent to it. This embodiment has a rounded barb 47, but in another embodiment barb 47 can be ramped or alternatively shaped. In the embodiment shown dip 46 is a radius semi-circle that facilitates the hook 10 to catch an attachment point such as a harness and then slide into position. Radiused corners can prevent a sharp edge, the smoother the shape at the end the easier it is to slide into an attachment point.

According to one embodiment, gate 14 encloses the open end of throat 50 and is positioned between the middle and lower portions 30 and 40 of the body 12. Gate 14 can pivot between a closed position and an open position. In one embodiment, one end of the gate 14 is pivotally attached to the gate attachment point 34 on the middle portion 30 of the body 12 such that it can pivot inward toward bend 42. Alternatively, gate 14 can be pivotably attached to the arm 44. The pivotal attachment can be accomplished by a spring or other mechanism, as should be known in the art, such that the gate 14 will close if no pressure is being applied to it.

According to one embodiment, gate 14 can only pivot inward toward the bend 42. Once the load is past the gate 14, it cannot be slid back out without manual intervention. To remove the rescue hook 10 from the load a user will have to manually open the gate 14. In one embodiment, the gate 14 is a stainless-steel gate however, the gate can be made from any other suitable material. The length of gate 14 can be equal to or greater than the width of throat 50. In another embodiment, the rescue hook 10 does not have a gate 14.

A benefit of rescue hook 10 over other rescue connectors is that in the situation of a wounded individual's sternal, dorsal or rescue connection point not being accessible to the individual performing the rescue. A user performing the rescue can attach the rescue hook 10 to the wounded individuals most accessible rated portion of their safety harness during the rescue process. The throat 50 is dimensioned to receive and hold multiple different sizes and shaped attachment points. Referring now to FIG. 4, according to one embodiment the rescue hook 10 can be used with webbing (ex. shoulder strap of a harness). The elongated throat 50 allows the wider width webbing to be slipped into the open end of the throat and held in the throat. Conventional hooks have smaller openings that are designed to be attached to hardware.

Figure 5:
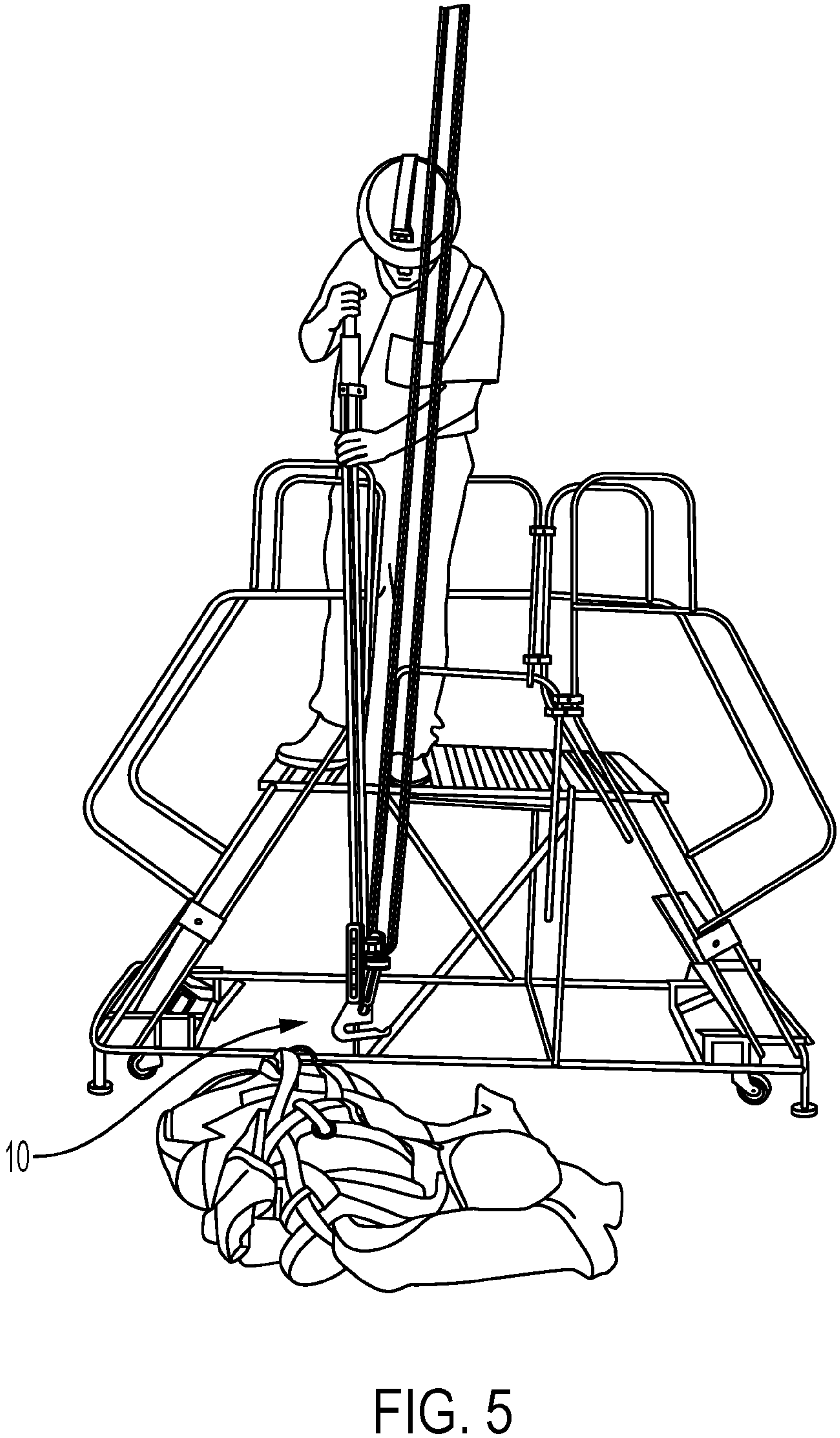
FIG. 5 is a perspective view of a rescue hook in use, according to an embodiment.
Figure 6:
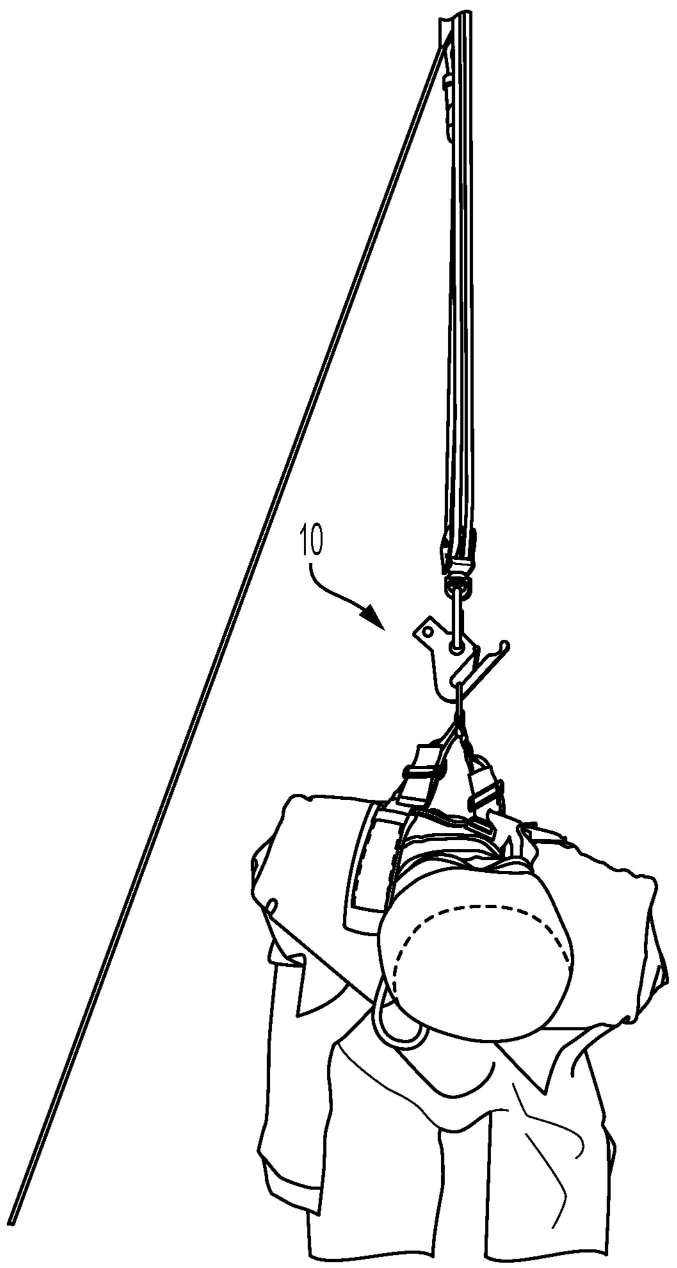
FIG. 6 is a perspective view of a rescue hook in use, according to an embodiment.
Figure 7:
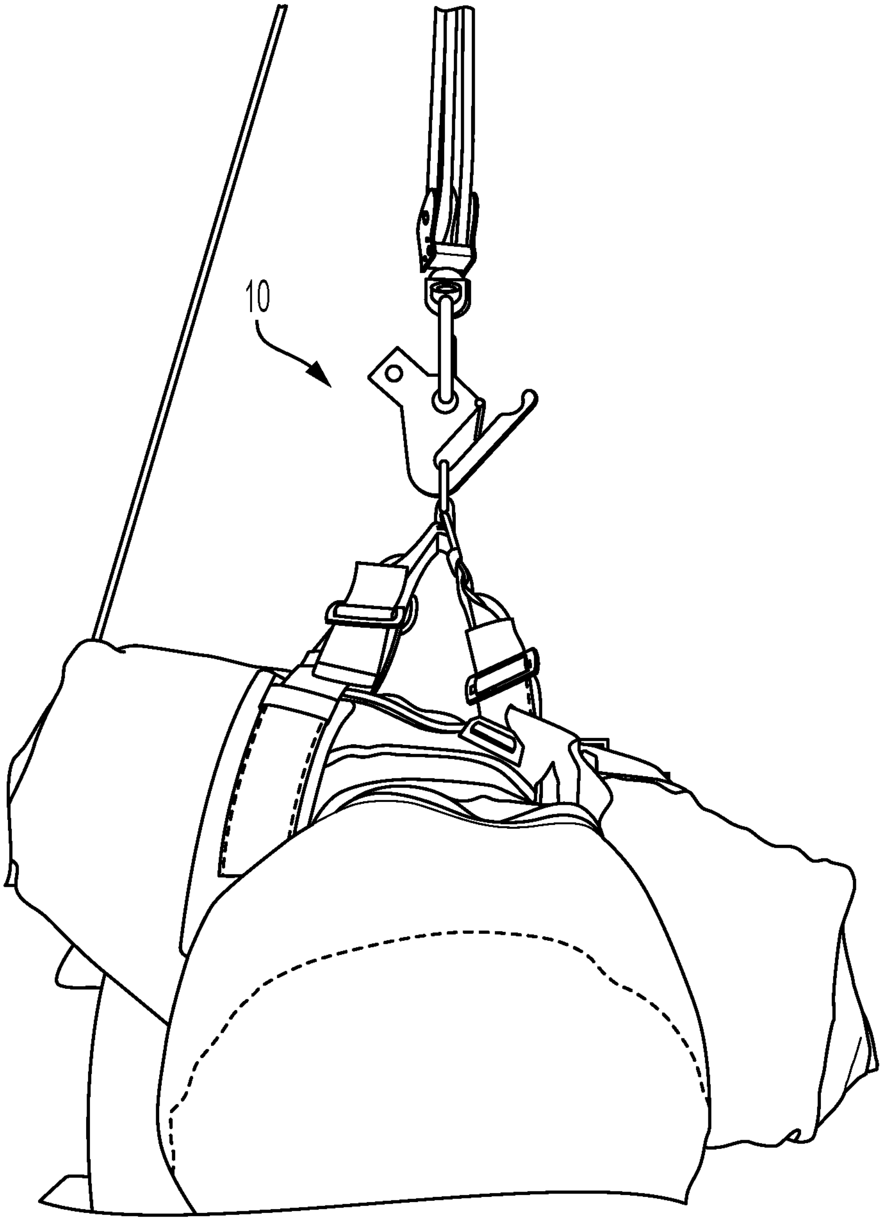
FIG. 7 is a perspective view of a rescue hook in use, according to an embodiment.

FIGS. 5-7 illustrate the steps of the method of using the rescue hook 10. A user can attach a placement tool such as a shotgun stick to the upper portion 20 of the rescue hook 10 and attach a connector with a line to the middle opening 32. As seen in FIG. 5, using a placement tool, a user can position the rescue hook 10 onto any available attachment point on a load or a person who has been injured. The rescue hook 10 can have a line or hook attached to the middle opening 32. The rescue hook 10 can be attached to a clip, webbing, or other suitable rated attachment point. To attach the rescue hook 10, the user should guide the rated attachment point past the gate 14 to the bend 42 of the throat 50. Once the rescue hook 10 is attached the user can detach the placement tool or leave it in place. Detachment with a shotgun stick involves reverse pumping the shotgun stick.

As shown in FIGS. 6 and 7, once the user begins to hoist the person upward with the line the rescue hook 10 will self-center. The line can rotate around the inner edge of the middle opening 32 such that the middle opening 32 is pointed toward the movement of the line and the rated attachment point of the load is in the bend 42 of the throat 50. This will put the weight of the load on the bottom of the rescue hook 10 in the bend 42. The weight should be pulling against the body 12 of the hook 10 and not pressing against gate 14. Once the load is in its desired place the user can remove the rescue hook 10 by opening the gate 14 and sliding the rated attachment point out of the throat 50 and past the open gate 14.

The rescue hook 10 can be made of any suitable material such as but not limited to steel, aluminum, or titanium. In one example, the rescue hook 10 meets industry standards such as the ANSI Z359.12 standard.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs.

As a result, a method or device that "comprises", "has", "includes" or "contains" one or more steps or elements. Likewise, a step of method or an element of a device that "comprises", "has", "includes" or "contains" one or more features possesses those one or more features but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A self-centering rescue hook device, comprising:

a body comprising:

a front surface and a back surface;

an upper portion having a central longitudinal axis and an upper opening formed through the front and back surfaces, the upper portion having a first side surface facing a first direction and extending in a first plane and a second side surface facing a second direction and extending in a second plane, wherein the first plane and second plane are parallel to the central longitudinal axis;

a middle portion having a first portion extending in the first direction away from the first plane, a second portion extending in the second direction away from the second plane, and a middle opening formed through the front and back surfaces configured to receive a connector;

a lower portion;

a throat formed in part by the middle portion and the lower portion having an open end and a closed end, the throat being configured to receive a load, the throat located below the middle opening such that during use an upper force on the connector centers the rescue hook device with the load biased toward the closed end of the throat; and a gate pivotable between an open position and closed position such that when in the closed position the gate encloses the open end of the throat.

2. The device of claim 1, the gate being pivotably attached to the middle portion.

3. The device of claim 2, wherein when the gate is in the closed position the gate is in communication with the lower portion.

4. The device of claim 1, wherein the lower portion has a dip adjacent to the open end of the throat.

5. The device of claim 1, further comprising a barb integrally attached to the lower portion positioned adjacent to the open end of the throat.

6. The device of claim 1, wherein the upper opening is circular.

7. The device of claim 1, wherein the middle opening is circular.

8. The device of claim 1, wherein the gate is biased with a spring.

9. The device of claim 1, wherein the device meets industry standard ANSI Z359.12.

10. A self-centering rescue hook device, comprising:

a body comprising:

a front surface and a back surface;

an upper portion having a central longitudinal axis and an upper opening formed through the front and back surfaces, the upper portion having a first side surface facing a first direction and extending in a first plane, and a second side surface facing a second direction and extending in a second plane, wherein the first plane and second plane are parallel to the central longitudinal axis;

a middle portion having a first portion extending in the first direction away from the first plane and a second portion extending in the second direction away from the second plane, and a middle opening formed through the front and back surfaces configured to receive a connector;

a lower portion; and a throat being formed by the middle portion and the lower portion having an open end and a closed end, the throat being configured to receive a load, the throat located below the middle opening such that during use an upper force on the connector self-centers the rescue hook device with the load biased toward the closed end of the throat.

11. The device of claim 10 further comprising a gate pivotable between an open position and closed position such that when in the closed position the gate encloses the open end of the throat.

12. The device of claim 11, wherein the gate is pivotably attached to the middle portion.

13. The device of claim 11, wherein the gate is biased with a spring.

14. The device of claim 10, wherein the upper opening is circular.

15. The device of claim 10, wherein the middle opening is circular.

16. The device of claim 10, wherein the lower portion has a barb positioned adjacent to the open end of the throat.

17. The device of claim 10, wherein the body further comprises a dip formed by the lower portion positioned adjacent to the open end of the throat.

18. A self-centering rescue hook device, comprising:

a body comprising:

a front surface and a back surface;

an upper portion having a central longitudinal axis and an upper opening formed through the front and back surfaces, the upper portion having a first side surface facing a first direction and extending in a first plane and a second side surface facing a second direction and extending in a second plane, wherein the first plane and second plane are parallel to the central longitudinal axis;

a middle portion having a first portion extending in the first direction away from the first plane and a second portion extending in the second direction away from the second plane, and a middle opening formed through the front and back surfaces configured to receive a connector;

a lower portion;

a throat formed in part by the middle portion and the lower portion, having an open end and a closed end, the throat being configured to receive a load, the throat located below the middle opening such that during use an upper force on the connector self-centers the rescue hook device with the load biased toward the closed end of the throat;

a gate attached to the middle portion and pivotable between an open position and closed position such that when in the closed position the gate encloses the open end of the throat; and a dip formed by the lower portion positioned adjacent to the open end of the throat.

19. The device of claim 18, wherein the upper opening is circular.

20. The device of claim 18, wherein the middle opening is circular.

21. A self-centering rescue hook device, comprising:

a body comprising:

a front surface and a back surface;

an upper portion having a central longitudinal axis and an upper opening formed through the front and back surfaces, the upper portion having a first side surface facing a first direction and extending in a first plane and a second side surface facing a second direction and extending in a second plane, wherein the first plane and second plane are parallel to the central longitudinal axis;

a middle portion having a first portion extending in the first direction away from the first plane and a second portion extending in the second direction away from the second plane, and a middle opening formed through the front and back surfaces configured to receive a connector;

a lower portion;

a throat extending in a direction perpendicular to the central longitudinal axis, formed in part by the middle portion and the lower portion having an open end and a closed end, the throat being configured to receive a load, the throat located below the middle opening such that during use an upper force on the connector centers the rescue hook device with the load biased toward the closed end of the throat; and a gate pivotable between an open position and closed position such that when in the closed position the gate encloses the open end of the throat.

22. The device of claim 21, the gate being pivotably attached to the middle portion.

23. The device of claim 21, wherein when the gate is in the closed position the gate is in communication with the lower portion.

24. The device of claim 21, wherein the lower portion has a dip adjacent to the open end of the throat.

25. The device of claim 21, further comprising a barb integrally attached to the lower portion positioned adjacent to the open end of the throat.

26. The device of claim 21, wherein the gate is biased with a spring.

* * * * *